US012682823B2

(12) United States Patent
Won et al.

(10) Patent No.: US 12,682,823 B2
(45) Date of Patent: Jul. 14, 2026

(54) DISPLAY DRIVING DEVICE FOR REDUCING POWER CONSUMPTION AND OPERATING METHOD THEREOF

(71) Applicant: LX SEMICON CO., LTD., Daejeon (KR)

(72) Inventors: Da Sol Won, Daejeon (KR); Yong Min Kim, Daejeon (KR); Jung Min Choi, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/117,017

(22) PCT Filed: Sep. 25, 2023

(86) PCT No.: PCT/KR2023/014625
§ 371 (c)(1),
(2) Date: Mar. 28, 2025

(87) PCT Pub. No.: WO2024/071891
PCT Pub. Date: Apr. 4, 2024

(65) Prior Publication Data

US 2025/0356792 A1 Nov. 20, 2025

(30) Foreign Application Priority Data

Sep. 29, 2022 (KR) ........................ 10-2022-0124362

(51) Int. Cl.
*G09G 3/20* (2006.01)

(52) U.S. Cl.
CPC ... *G09G 3/2092* (2013.01); *G09G 2300/0814* (2013.01); *G09G 2300/0828* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2020/0126465 A1 4/2020 Duan et al.

FOREIGN PATENT DOCUMENTS

CN 104424898 A 3/2015
CN 114267295 A 4/2022
(Continued)

OTHER PUBLICATIONS

International Search Report dated Jan. 11, 2024 issued in Patent Application No. PCT/KR2023/014625 (4 pages).
(Continued)

*Primary Examiner* — Aneeta Yodichkas
(74) *Attorney, Agent, or Firm* — Polsinelli PC

(57) ABSTRACT

A display driving device is disclosed. The display driving device comprises: a reception circuit for receiving first display data including data values of a first group; a transmission control circuit that outputs the first display data or outputs second display data including data values of a second group; and a data processing circuit for processing the first display data or the second display data output from the transmission control circuit, wherein the transmission control circuit comprises an inverting circuit that: if the data values of the first group are not the same as the target data values, bypasses the first display data to the data processing circuit; if the data values of the first group are the same as the target data values, converts the data values of the first group into the data values of the second group.

18 Claims, 12 Drawing Sheets

(56) References Cited

FOREIGN PATENT DOCUMENTS

| | | | |
|---|---|---|---|
| KR | 10-2002-0061541 | A | 7/2002 |
| KR | 10-2007-0117759 | A | 12/2007 |
| KR | 10-2011-0139317 | A | 12/2011 |
| KR | 10-2015-0007809 | A | 1/2015 |
| KR | 10-2015-0090634 | A | 8/2015 |
| KR | 10-2018-0012438 | A | 2/2018 |
| KR | 10-2414300 | B1 | 6/2022 |
| WO | 2010/123753 | A1 | 10/2010 |

OTHER PUBLICATIONS

Korean Office Action dated Jan. 29, 2026 issued in Patent Application No. KR 10-2022-0124362 w/English Translation (15 pages).
Chinese Office Action dated Apr. 24, 2026 issued in Patent Application No. 202380069709.4 w/English Translation (14 pages).

FIG. 5

| | S1 | S2 | S3 | DOUT |
|---|---|---|---|---|
| 00000000 | H | L | L | (IN1=REFD1) 11111111 |
| 11111111 | L | H | L | (IN2=REFD2) 00000000 |
| DATA | L | L | H | (IN3) DATA |

FIG. 6

| | S1 | S2 | S3 | DOUT |
|---|---|---|---|---|
| 00000001 | H | L | L | (IN1=REFD1) 11111110 |
| 11111110 | L | H | L | (IN2=REFD2) 00000001 |
| DATA | L | L | H | (IN3) DATA |

FIG. 8A

| Input Data / Target Data | ODDi<N:1> | EVENi<N:0> |
|---|---|---|
| Odd Data | SEL=L | SEL=H |
| Even Data | SEL=H | SEL=L |

FIG. 8B

Inversion target data type : Even Data and Target data value : 00000000 and 11111111

| Input Data (DATA) | ODDi<N:1> | EVENi<N:1> | DAC1O | DAC2O |
|---|---|---|---|---|
| 00000000 | 00000000 | 11111111 | VGMA_VH0 | VGMA_VL0 |
| 00000001 | 00000001 | 00000001 | VGMA_VH1 | VGMA_VL1 |
| 00000010 | 00000010 | 00000010 | VGMA_VH2 | VGMA_VL2 |
| ⋮ | ⋮ | ⋮ | ⋮ | ⋮ |
| 11111101 | 11111101 | 11111101 | VGMA_VH253 | VGMA_VL253 |
| 11111110 | 11111110 | 11111110 | VGMA_VH254 | VGMA_VL254 |
| 11111111 | 11111111 | 00000000 | VGMA_VH255 | VGMA_VL255 |

DISPLAY DRIVING DEVICE FOR REDUCING POWER CONSUMPTION AND OPERATING METHOD THEREOF

CROSS-REFERENCE TO RELATED APPLICATIONS

This application is a national phase entry of PCT International Application No. PCT/KR2023/014625 filed on Sep. 25, 2023, which claims the priority of Korean Application No. 10-2022-0124362 filed on Sep. 29, 2022, which are hereby incorporated by reference in their entirety.

BACKGROUND

Field of the Disclosure

The present disclosure relates to a semiconductor integrated circuit, and more particularly to a display driving device of a display device.

For simplicity of description, the present specification describes a source driver integrated circuit (IC), which is an example of a display driving device, but the present disclosure is applicable to any type of display driving device.

Description of the Background

A source driver integrated circuit (IC) that drives data lines included in a display device includes a digital-to-analog converter (DAC; hereinafter referred to as "DAC") and level shifters.

Each of the level shifters shifts the voltage level of each input digital video signal to generate an output digital video signal with a shifted voltage level, in order to control the on or off state of each switch that is included in the DAC and consumes dynamic current.

In response to the output digital video signals with shifted voltage levels outputted from the level shifters, the switches included in the DAC output one of the grayscale voltages generated by a grayscale voltage generator to one of the data lines.

However, as the resolution of the display device increases, the number of source driver ICs also increases in proportion to the resolution, and as the number of source driver ICs increases, the number of level shifters also increases. This leads to an increase in current consumption due to the level shifters, thereby causing an increase in the power consumption of the source driver ICs.

To solve the above-mentioned problem, the present disclosure aims to provide a source driver IC capable of reducing power consumption by inverting specific display data values, a display device including the source driver IC, and a method for reducing power consumption of the source driver IC.

A display driving device according to one aspect of the present disclosure for overcoming the above-described technical problem includes: a reception circuit configured to receive first display data including a first group of data values; a transmission control circuit configured to output the first display data or second display data including a second group of data values based on a comparison result between the first group of data values and target data values; and a data processing circuit configured to process the first display data or the second display data outputted from the transmission control circuit, wherein the transmission control circuit includes an inversion circuit configured to bypass the first display data to the data processing circuit when the first group of data values are not respectively the same as the target data values, to convert the first group of data values into the second group of data values that are respectively complementary to the first group of data values when the first group of data values are respectively the same as the target data values; and to output the second display data including the second group of data values to the data processing circuit.

An operating method of a display driving device according to another aspect of the present disclosure for overcoming the above-described technical problem includes: receiving first display data including a first group of data values; determining whether the first group of data values are the same as target data values; bypassing the first display data when the first group of data values are not respectively the same as the target data values; and outputting second display data including a second group of data values instead of the first group of data values when the first group of data values are respectively the same as the target data values, wherein the second group of data values are respectively complementary to the first group of data values.

According to the present disclosure, by dynamically inverting specific display data values, the power consumption of a digital-to-analog converter (DAC) may be reduced, and through the reduction in the power consumption of the DAC, the power consumption of the source driver IC may be decreased.

BRIEF DESCRIPTION OF THE DRAWINGS

FIG. 5 is an aspect of display data for describing the operation of the inversion circuit shown in FIG. 4.

FIG. 6 is another aspect of display data for describing the operation of the inversion circuit shown in FIG. 4.

FIG. 8A is a table illustrating the operation of a selection signal generation circuit shown in FIG. 7.

FIG. 8B is a table illustrating input and output signals of each of the first data processing circuit and the second data processing circuit shown in FIG. 2.

DETAILED DESCRIPTION

Figure 1:
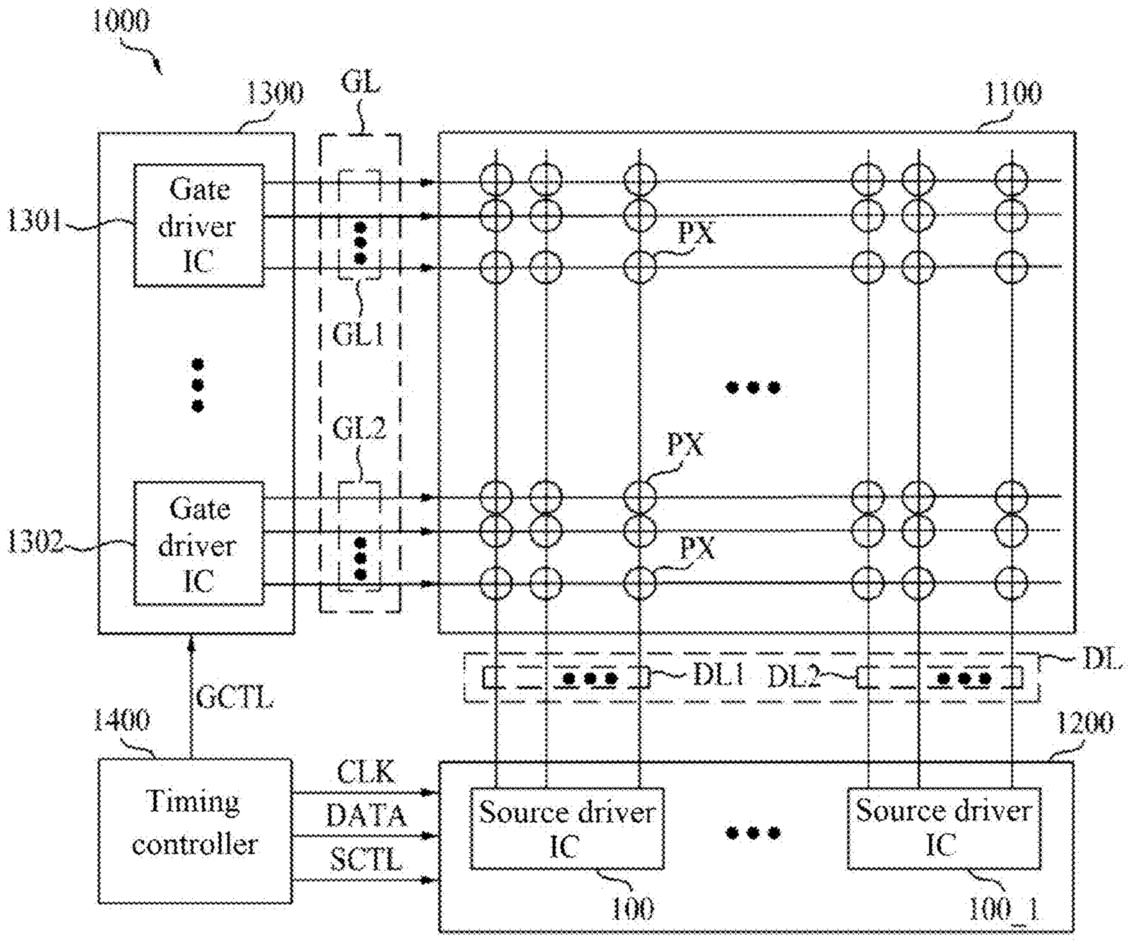
FIG. 1 is a block diagram of a display device including a source driver IC according to one aspect of the present disclosure.

Throughout the specification, the same reference numerals refer to substantially the same components. In the following description, detailed descriptions of configurations and features known in the art may be omitted if they are not relevant to the core configuration of the present disclosure. Terms used in this specification should be understood as follows.

The advantages and features of the present disclosure, and methods of achieving them will be apparent from the embodiments described in detail below in conjunction with the accompanying drawings. However, the present disclosure is not limited to the following embodiments, but may be implemented in various different forms; rather, the present embodiments are provided to make the description of the present disclosure complete and to allow those skilled in the art to fully understand the scope of the present disclosure, and the present disclosure is defined only within the scope of the appended claims.

The shapes, sizes, proportions, angles, numbers and the like shown in the accompanying drawings for the purpose of illustrating the embodiments of the present disclosure are merely examples, and the present disclosure is not limited thereto. Identical reference numerals may designate identical components throughout the description. Further, in describing the present disclosure, detailed descriptions of known related technologies may be omitted if it is considered to unnecessarily obscure the gist of the present disclosure.

The terms such as “including,” “having,” “comprising,” or the like used herein are generally intended to allow other components to be added unless the terms are used with the term “only.” References to components of a singular noun include the plural of that noun, unless specifically stated otherwise.

In interpreting components, they are construed to include a margin of error, even if it is not explicitly stated.

When describing a positional relationship, for example, “on,” “above,” “below,” or “next to” describes the positional relationship of two parts, one or more other parts may be located between the two parts, unless “immediately” or “directly” is used.

When describing a temporal contextual relationship is described, for example, such as “after,” “following,” “next to,” or “before,” it may also include non-contiguous cases unless “immediately” or “directly” is used.

The first, the second, and so on are used to describe various components, but these components are not limited by these terms. These terms are used only to distinguish one component from another. Therefore, the first component referred to herein may also be a second component within the technical idea of the present disclosure.

It should be understood that the term “at least one” includes any combination that may be presented from one or more relevant items. For example, the meaning of “at least one of the first item, the second item, and the third item” may mean each of the first item, the second item, and the third item as well as any combination of items that may be presented from two or more of the first item, the second item, and the third item.

Each of the features of various embodiments of the present disclosure may be coupled or combined with one another in whole or in part, and may be technologically interlocked and operated in various ways, and each of the embodiments may be carried out independently or in conjunction with one another.

Hereinafter, embodiments of the present specification will be described in detail with reference to the accompanying drawings.

FIG. 1 is a block diagram of a display device including a source driver IC according to one aspect of the present disclosure.

Referring to FIG. 1, a display device 1000 includes a display panel 1100, a source driver IC block 1200, a gate driver IC block 1300, and a timing controller 1400.

The display device 1000 may be a liquid crystal display (LCD) device, a light-emitting diode (LED) display device, an organic light-emitting diode (OLED) display device, or an active-matrix organic light-emitting diode (AMOLED) display device. For example, the display device 1000 may be a laptop computer, but is not limited thereto.

The display panel 1100 includes a plurality of gate lines GL, a plurality of data lines DL, and a plurality of pixels PX. The plurality of pixels PX are connected to each of the gate lines GL and each of the data lines DL and are arranged in a matrix form.

The source driver IC block 1200 includes a plurality of source driver ICs 100 and 100_1 that drive the data lines DL. In one aspect, the data lines DL may be referred to as channels, and the source driver ICs 100 and 100_1 may be referred to as data driver ICs.

For example, a first source driver IC 100 drives a first group of data lines DL1 among the data lines DL, and a second source driver IC 100_1 drives a second group of data lines DL2 among the data lines DL. It is assumed that the structures of the source driver ICs 100 and 100_1 are the same.

The gate driver IC block 1300 includes a plurality of gate driver ICs 1301 and 1302 that generate gate driving signals to drive the gate lines GL.

For example, a first gate driver IC 1301 generates first gate driving signals for driving a first group of gate lines GL1 among the gate lines GL, and a second gate driver IC 1302 generates second gate driving signals for driving a second group of gate lines GL2 among the gate lines GL. It is assumed that the structures of the gate driver ICs 1301 and 1302 are the same.

The timing controller 1400 generates gate driver control signals GCTL for controlling the operation of each of the plurality of gate driver ICs 1301 and 1302, and outputs them to the plurality of gate driver ICs 1301 and 1302.

In addition, the timing controller 1400 generates a clock signal CLK, display data DATA, and source driving control signals SCTL and outputs them to the plurality of source driver ICs 100 and 100_1.

Figure 2:
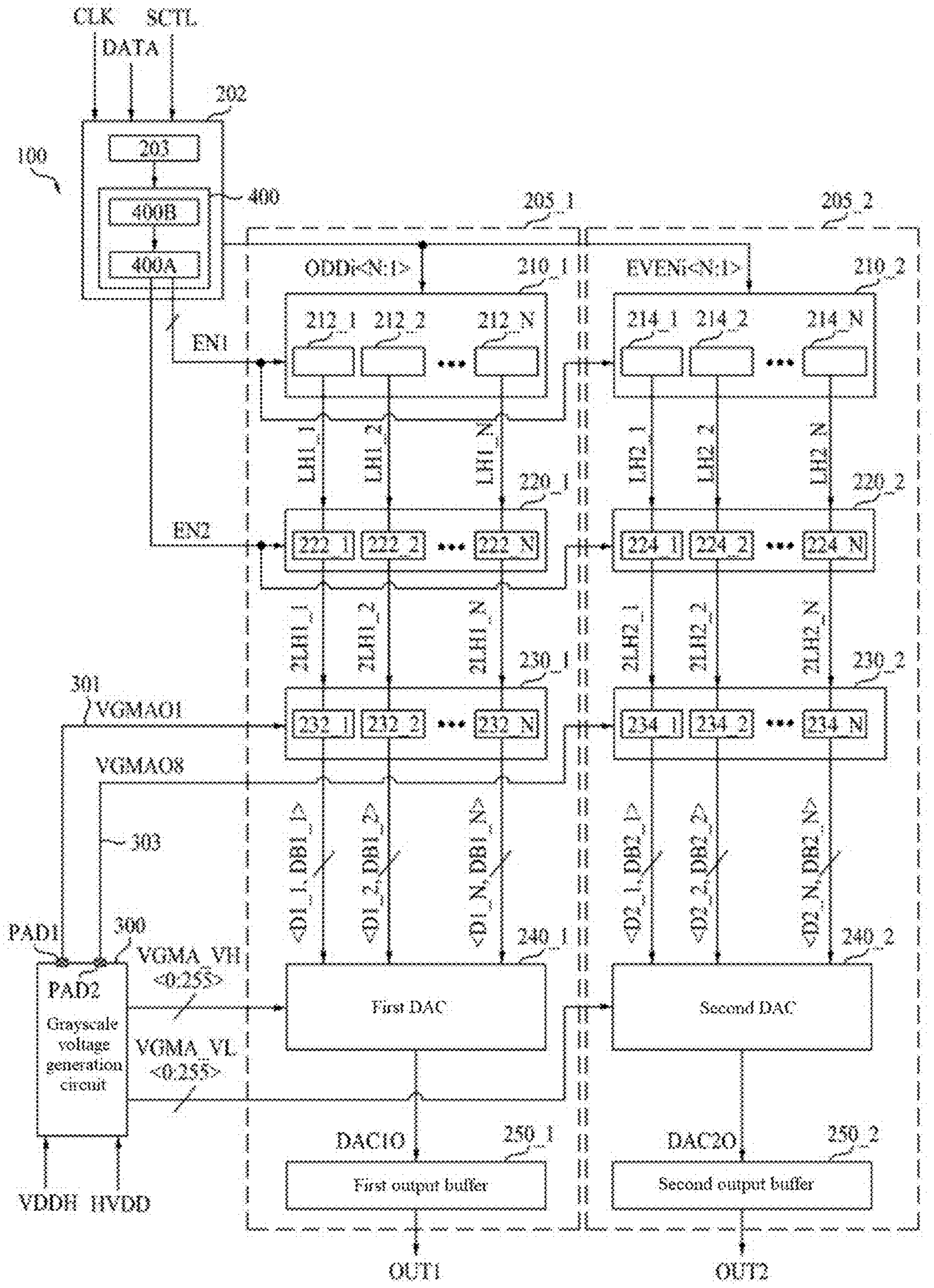
FIG. 2 is a block diagram of the source driver IC shown in FIG. 1.

FIG. 2 is a block diagram of the source driver IC shown in FIG. 1.

Referring to FIGS. 1 and 2, since the structures of the source driver ICs 100 and 100_1 are the same, the structure and operation of the first source driver IC 100 will be described in detail with reference to FIGS. 1 to 11.

The first source driver IC (or a first source driver IC package) 100 includes a control logic circuit 202, a first data processing circuit (or odd-numbered data processing circuit) 205_1, a second data processing circuit (or even-numbered data processing circuit) 205_2, and a grayscale voltage generation circuit 300.

The control logic circuit 202 includes a reception circuit 203 and a transmission control circuit 400. Although not shown in FIG. 2, the control logic circuit 202 may further include a configuration for generating first latch enable signals EN1 and a second latch enable signal EN2 using the source driving control signals SCTL.

The reception circuit 203 receives the display data (e.g., RGB data) DATA using the clock signal CLK, and transmits the received display data to the transmission control circuit 400. In this case, the display data may be a first display data including a first group of data values.

When receiving the first display data from the reception circuit 203, the transmission control circuit 400 outputs the first display data to the first or second data processing circuit 205_1 or 205_2, or outputs second display data including a second group of data values to the first or second data processing circuit 205_1 or 205_2, based on a comparison result between the first group of data values and target data values. In one aspect, the transmission control circuit 400 may include a determination circuit 400B and an inversion circuit 400A.

Figure 11:
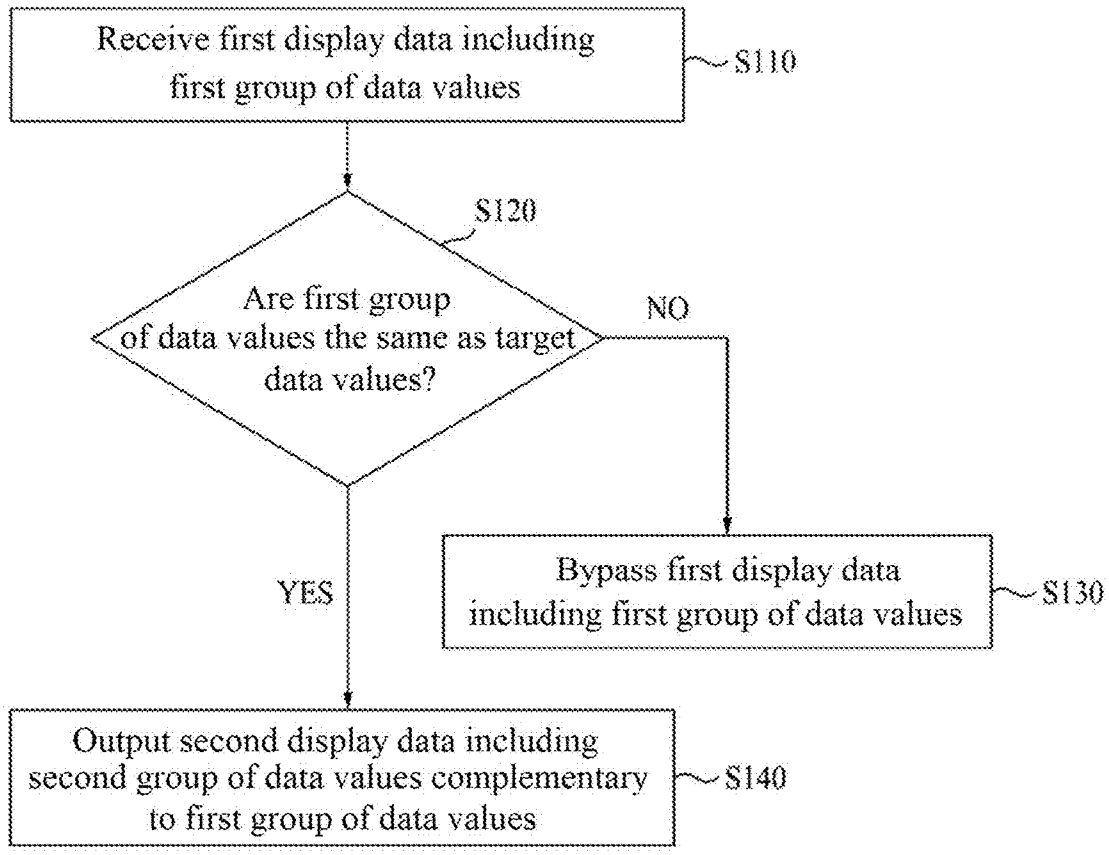
FIG. 11 is a flowchart illustrating the operation of a transmission control circuit according to one aspect of the present disclosure.

Hereinafter, the operation of the transmission control circuit 400 of the present disclosure will be briefly described with reference to FIG. 11. FIG. 11 is a flowchart illustrating the operation of a transmission control circuit according to one aspect of the present disclosure. Referring to FIGS. 2 and 11, the transmission control circuit 400 receives the first display data DATA including the first group of data values from the reception circuit 203 (S110), and determines whether the first group of data values are the same as the target data values (S120). If it is determined that the first group of data values are not the same as the target data values (NO in S120), the transmission control circuit 400 bypasses the first display data DATA (=ODDi<N:1> or EVENi<N:1>) to the first data processing circuit 205_1 and the second data processing circuit 205_2 (S130). On the other hand, if, as a result of the determination in step S120, the first group of data values are the same as the target data values (YES in step S120), the transmission control circuit 400 outputs second display data ODDi<N:1> or EVENi<N:1> including the second group of data values instead of the first group of data values to the first data processing circuit 205_1 and the second data processing circuit 205_2 (S140).

For example, even if the first data processing circuit 205_1 receives the first display data ODDi<N:1> including the first group of data values or the second display data ODDi<N:1> including the second group of data values, the first data processing circuit 205_1 outputs, as a first output signal OUT1, a grayscale voltage corresponding to the first group of data values among a first group of grayscale voltages VGMA_VH0 to VGMA_VH255 (S140).

Additionally, even if the second data processing circuit 205_2 receives the first display data EVENi<N:1> including the first group of data values or the second display data EVENi<N:1> including the second group of data values, the second data processing circuit 205_2 outputs, as a second output signal OUT2, a grayscale voltage corresponding to the first group of data values among a second group of grayscale voltages VGMA_VL0 to VGMA_VL255 (S140).

Figure 8C:
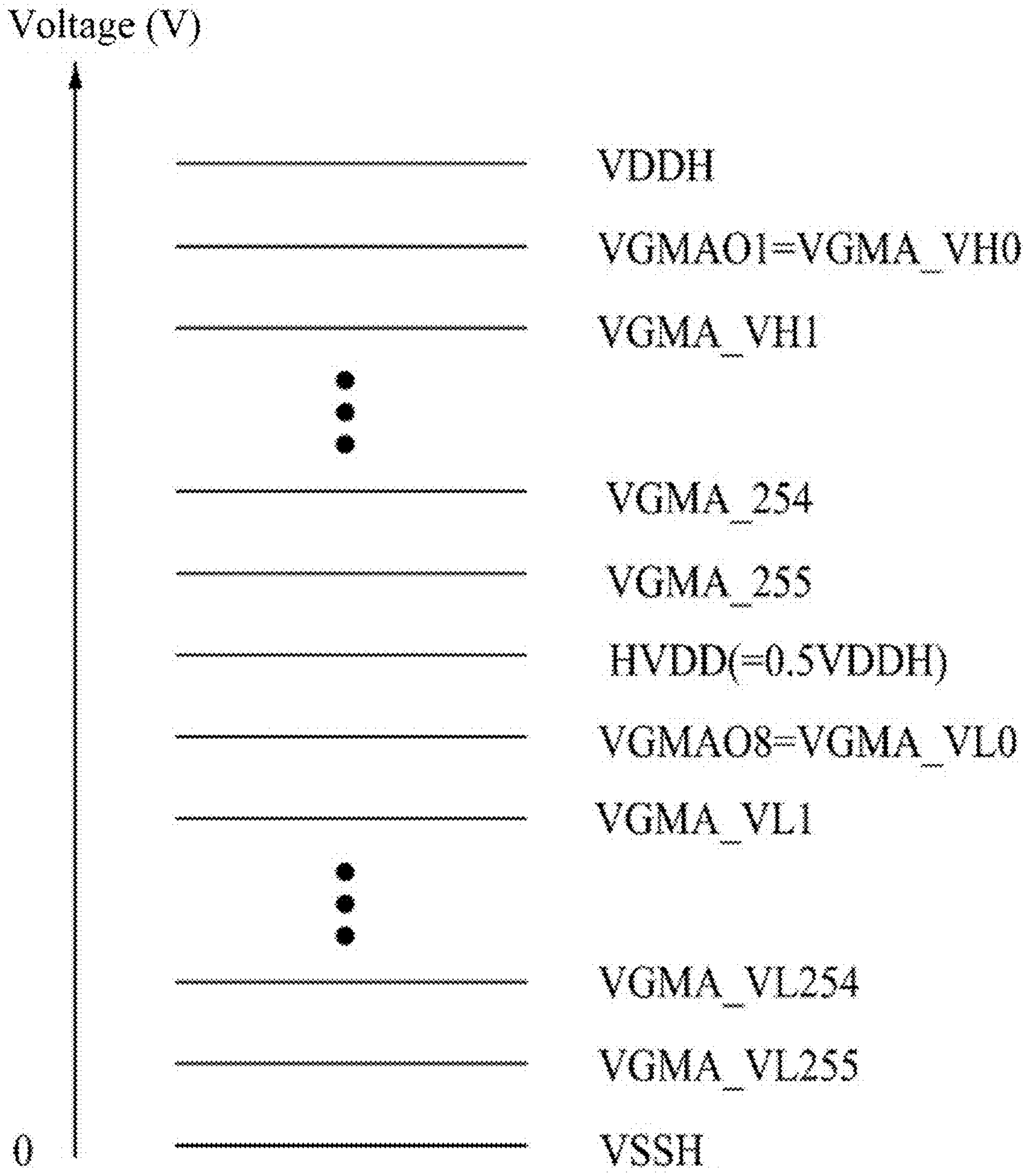
FIG. 8C is a diagram exemplarily illustrating the level of each of the grayscale voltages shown in FIG. 2.

The level of each of the first group of grayscale voltages VGMA_VH0 to VGMA_VH255 and the level of each of the second group of grayscale voltages VGMA_VL0 to VGMA_VL255 are exemplarily shown in FIG. 8C.

According to embodiments, the data value may be any one of data 1 and data 0.

According to embodiments, the target data values may all be the same. For example, when N is 8 and the target data values that are the same as the first group of data values are 00000000 (or 11111111), the second group of data values are 11111111 (or 00000000).

According to embodiments, when only one of the target data values is one of data 1 and data 0), each of the remaining target data values may be the other of data 1 and data 0).

For example, when N is 8 and the target data values that are the same as the first group of data values are 00000001, 00000010, 00000100, 00001000, 00010000, 00100000, 01000000, or 10000000, the second group of data values are 11111110, 11111101, 11111011, 11110111, 11101111, 11011111, 10111111, or 01111111.

The second group of data values are respectively complementary to the first group of data values. For example, data 1 (also referred to as logic 1) and data 0) (also referred to as logic 0) are considered to be complementary to each other.

Figure 3:
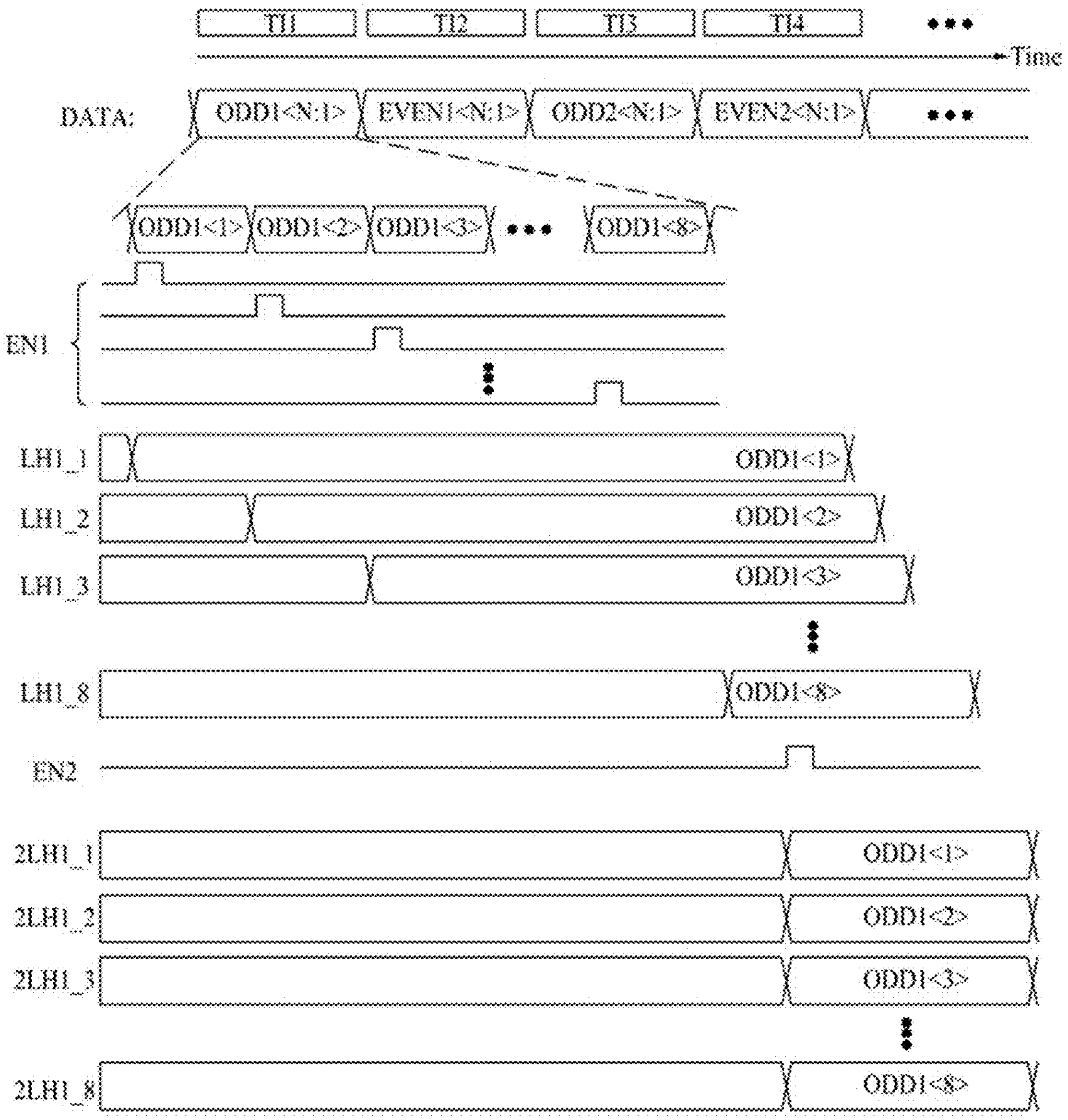
FIG. 3 is a timing diagram illustrating the operation of latch circuits that latch odd-numbered data and even-numbered data supplied to the source driver IC of FIG. 2.

FIG. 3 is a timing diagram illustrating the operation of latch circuits that latch odd-numbered data and even-numbered data supplied to the source driver IC of FIG. 2.

From the perspective of the timing of the display data DATA inputted to the control logic circuit 202, each display data ODD1<N:1>, EVEN1<N:1>, ODD2<N:1>, EVEN2<N:1>, . . . shown in FIG. 3 is a continuous (or serial) display data (or display data stream).

For example, each display data ODD1<N:1>, EVEN1<N:1>, ODD2<N:1>, EVEN2<N:1>, . . . is an N-bit serial display data, where each of the N bits is either data 1 or data 0, and the voltage of data 1 is at a high level and the voltage of data 0 is at a low level.

Referring to FIGS. 2 and 3, the transmission control circuit 400 of the control logic circuit 202 extracts (or separates) odd-numbered data ODDi<N:1> and even-numbered data EVENi<N:1> from the serial input display data DATA using the clock signal CLK, and outputs the extracted data ODDi<N:1> or EVENi<N:1> to the first data processing circuit 205_1 and the second data processing circuit 205_2 in a time division manner.

Therefore, it is assumed that in response to the first latch enable signals EN1, when the first data processing circuit 205_1 operates, the second data processing circuit 205_2 does not operate, and when the second data processing circuit 205_2 operates, the first data processing circuit 205_1 does not operate.

The first data processing circuit 205_1 receives the odd-numbered data ODDi<N:1> outputted from the transmission control circuit 400, processes it (e.g., sequentially performs a latch operation, a serial-to-parallel converting operation, a voltage level shifting operation, and a digital-to-analog converting operation), and outputs the processing result OUT1 to one of the first data lines DL1. Here, N and i are natural numbers.

The second data processing circuit 205_2 receives the even-numbered data EVENi<N:1> outputted from the transmission control circuit 400, processes it (e.g., sequentially performs a latch operation, a series-to-parallel converting operation, a voltage level shifting operation, and a digital-to-analog converting operation), and outputs the processing result OUT2 to another one of the first data lines DL1.

The first data processing circuit 205_1 includes a first latch circuit 210_1, a second latch circuit 220_1, a first level shifter circuit 230_1, a first DAC 240_1, and a first output buffer 250_1.

The first latch circuit 210_1 includes first latches 212_1 to 212_8, and latches (or converts) 8-bit serial odd-numbered data ODDi<8:1> into 8-bit parallel odd-numbered data LH1_1 to LH1_8 in response to the first latch enable signals EN1.

In one aspect, each of the first latches 212_1 to 212_8 may be a D-flip-flop capable of latching a 1-bit data value, and the first latch enable signals EN1 may be parallel signals activated at different timings, as shown in FIG. 3.

During a first operation time TI1, when 8-bit first odd-numbered serial data ODD1<8:1> is sequentially inputted to the first latch circuit 210_1, the first latches 212_1 to 212_8 latch the respective data ODD1<1> to ODD1<8> in response to the respective first latch enable signals EN1, and output the latched data LH1_1 to LH1_8 to the second latch circuit 220_1.

The second latch circuit 220_1 includes second latches 222_1 to 222_8, and the second latches 221_1 to 222_8 latch the respective data LH1_1 to LH1_8 in response to the second latch enable signal EN2, and output latched data 2LH1_1 to 2LH1_8 to the first level shifter circuit 230_1.

The second data processing circuit 205_2 includes a third latch circuit 210_2, a fourth latch circuit 220_2, a second level shifter circuit 230_2, a second DAC 240_2, and a second output buffer 250_2.

The third latch circuit 210_2 includes third latches 214_1 to 214_8, and latches (or converts) 8-bit serial even-numbered data EVENi<8:1> into 8-bit parallel even-numbered data LH2_1 to LH2_8 in response to the first latch enable signals EN1.

For example, each of the third latches 214_1 to 214_8 may be a D-flip-flop capable of latching a 1-bit data value, and the first latch enable signals EN1 may be parallel signals activated at different timings, as shown in FIG. 3.

The activation timing of each of the first latch enable signals EN1 supplied to the first latch circuit 210_1 is different from the activation timing of each of the first latch enable signals EN1 supplied to the third latch circuit 210_2. Therefore, the third latch circuit 210_2 does not operate when the first latch circuit 210_1 operates.

During a second operation time TI2, when 8-bit first even-numbered serial data EVEN1<8:1> is sequentially inputted to the third latch circuit 210_2, the third latches 214_1 to 214_8 latch the respective data EVEN1<1> to EVEN1<8> in response to the respective first latch enable signals EN1, and output the latched data LH2_1 to LH2_8 to the fourth latch circuit 220_2.

The fourth latch circuit 220_2 includes fourth latches 224_1 to 224_8, and the fourth latches 224_1 to 224_8 latch the respective data LH2_1 to LH2_8 in response to the second latch enable signal EN2, and output latched data 2LH2_1 to 2LH2_8 to the second level shifter circuit 230_2.

The process of handling 8-bit second odd-numbered serial data ODD2<8:1> during a third operation time TI3 is the same as or similar to the process of handling the 8-bit first odd-numbered serial data ODD1<8:1> during the first operation time TI1 described with reference to FIG. 3. Therefore, a description of the process of handling the 8-bit second odd-numbered serial data ODD2<8:1> is omitted.

Additionally, the process of handling 8-bit second even-numbered serial data EVEN2<8:1> during a fourth operation time TI4 is the same as or similar to the process of handling the 8-bit first even-numbered serial data EVEN1<8:1> during the second operation time TI2. Therefore, a description of the process of handling the 8-bit second even-numbered serial data EVEN2<8:1> is omitted.

The process of handling each data EVEN1<8:1>, ODD2<8:1>, EVEN2<8:1>, . . . is the same as or similar to the process of handling the data ODD1<8:1> described with reference to FIG. 3, and thus a description thereof is omitted.

The grayscale voltage generation circuit 300 receives a first operating voltage VDDH and a second operating voltage HVDD, and generates the first group of grayscale voltages VGMA_VH0 to VGMA_VH255 using the first operating voltage VDDH and the second operating voltage HVDD. The grayscale voltage generation circuit 300 outputs the generated grayscale voltages VGMA_VH0 to VGMA_VH255 to the first DAC 240_1.

The grayscale voltage generation circuit 300 generates the second group of grayscale voltages VGMA_VL0 to VGMA_VL255 using the second operating voltage HVDD and a ground voltage, and outputs the generated grayscale voltages VGMA_VL0 to VGMA_VL255 to the second DAC 240_2. In one aspect, the second operating voltage HVDD may be half of the first operating voltage VDDH.

Figure 4:
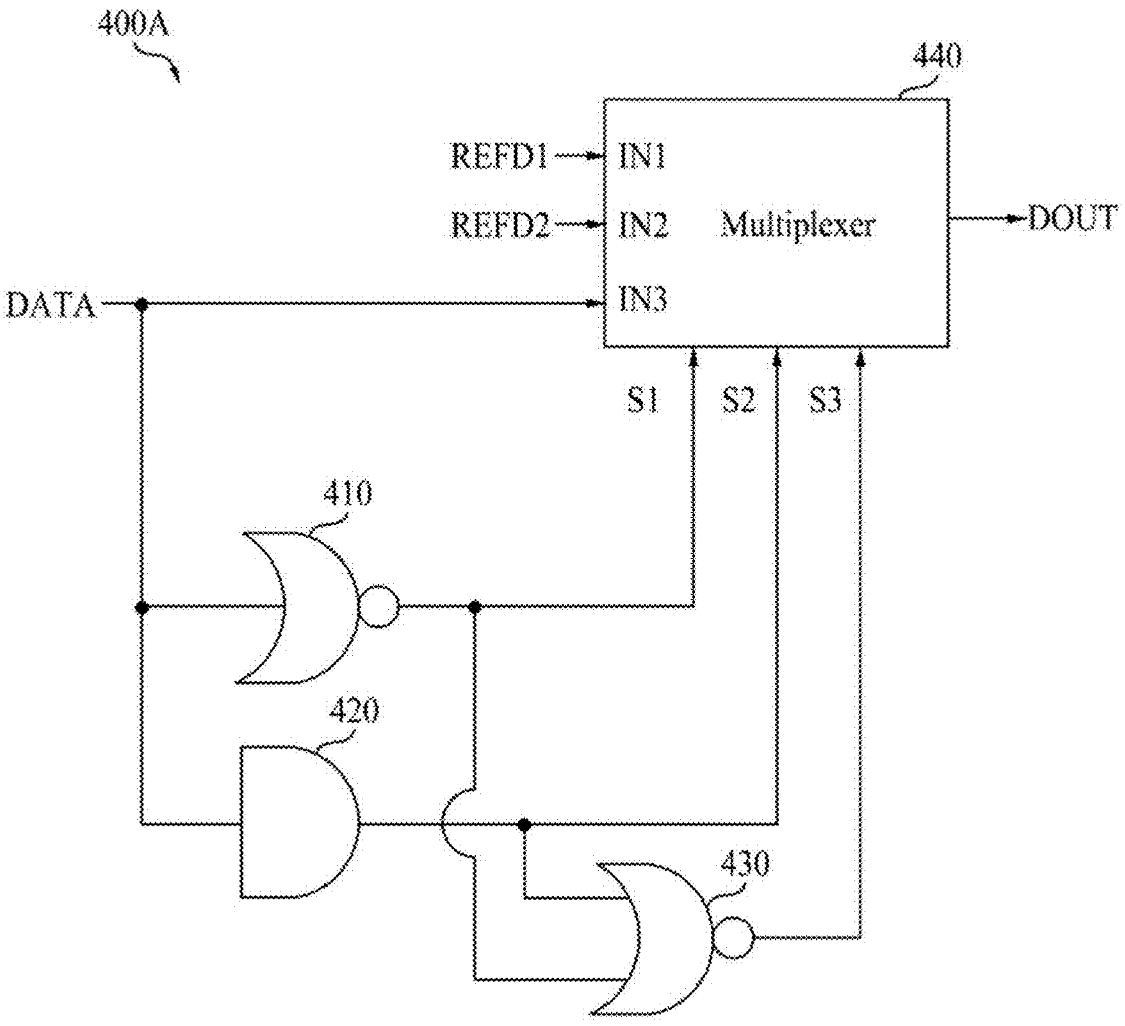
FIG. 4 is a diagram illustrating one example of a circuit diagram of an inversion circuit included in a transmission control circuit of the source driver IC of FIG. 2.

FIG. 4 is a diagram illustrating one example of a circuit diagram of an inversion circuit included in a transmission control circuit of the source driver IC of FIG. 2, and FIG. 5 is an aspect of display data for describing the operation of the inversion circuit shown in FIG. 4.

Referring to FIGS. 3, 4, and 5, the inversion circuit 400A includes a first target data value detection circuit 410, a second target data value detection circuit 420, a logic gate circuit 430, and a selection circuit 440. The selection circuit 440 may be implemented as a multiplexer.

It is assumed that the first target data value detection circuit 410 is designed to output an output signal S1 having a high level H only when the first group of data values 8'b00000000 and the target data values 8'b00000000 are the same, and the second target data value detection circuit 420 is designed to output an output signal S2 having the high level H only when the first group of data values 8'b11111111 and the target data values 8'b11111111 are the same. It is also assumed that a first reference data REFD1 is 8'b11111111 and a second reference data REFD2 is 8'b00000000. The target data values may refer to specific display data values included in the data DATA.

1-1. In the case that the first group of data values included in the first display data DATA (=ODD1<8:1>) are 8'600000000

For example, the first target data value detection circuit 410 may be implemented as a NOR gate circuit, and outputs the output signal S1 having the high level H when each of the first group of data values (8'b00000000) is data 0.

The second target data value detection circuit 420 may be implemented as an AND gate circuit, and outputs the output signal S2 having the high level H when each of the first group of data values (8'b11111111) is data 1.

When the first group of data values included in the first display data DATA (=ODD1<8:1>) is 8'b00000000, the first target data value detection circuit 410 generates the first output signal S1 having the high level H, the second target data value detection circuit 420 generates the second output signal S2 having a low level L, and the logic gate circuit 430 implemented as a NOR gate circuit generates a third output signal S3 having the low level L.

In response to the first output signal S1 having the high level H, the second output signal S2 having the low level L, and the third output signal S3 having the low level L, the multiplexer 440 outputs the first reference data REFD1 (=8'b11111111), which is inputted through a first input terminal IN1, as output data DOUT to the first data processing circuit 205_1 and the second data processing circuit 205_2.

Only the first data processing circuit 205_1 receives and processes the second display data (DOUT=ODD1<8:0>) including the second group of data values (REFD1=8'b11111111).

For example, even if the first data processing circuit 205_1 receives the second group of data values (REFD1=8'b11111111), the first data processing circuit 205_1 does not output the grayscale voltage VGMA_VH255 corresponding to the second group of data values (REFD1=8'b11111111) as the first output signal OUT1, but outputs the grayscale voltage VGMA_VH0 corresponding to the first group of data values 8'b00000000 as the first output signal OUT1.

In other words, the first data processing circuit 205_1 outputs, as the first output signal OUT1, the grayscale voltage VGMA_VH0 corresponding to the first group of data values 8'b00000000 included in the original first display data DATA (=ODD1<8:1>).

1-2. In the case that the first group of data values included in the first display data DATA (=ODD1<8:1>) are 8'b11111111

When the first group of data values included in the first display data DATA (=ODD1<8:1>) are 8'b11111111, the first target data value detection circuit 410 generates the first output signal S1 having the low level L, the second target data value detection circuit 420 generates the second output signal S2 having the high level H, and the logic gate circuit 430 implemented as a NOR gate circuit generates the third output signal S3 having the low level L.

In response to the first output signal S1 having the low level L, the second output signal S2 having the high level H, and the third output signal S3 having the low level L, the multiplexer 440 outputs the second reference data REFD2 (=8'b00000000), which is inputted through a second input terminal IN2, as the output data DOUT to the first data processing circuit 205_1 and the second data processing circuit 205_2.

Only the first data processing circuit 205_1 receives and processes the second display data (DOUT=ODD1<8:0>) including the second group of data values (REFD2=8'b00000000).

For example, even if the first data processing circuit 205_1 receives the second group of data values (REFD2=8'b00000000), the first data processing circuit 205_1 does not output the grayscale voltage VGMA_VH0 corresponding to the second group of data values (REFD2=8'b00000000) as the first output signal OUT1, but outputs the grayscale voltage VGMA_VH255 corresponding to the first group of data values 8'b1111111111 as the first output signal OUT1.

In other words, the first data processing circuit 205_1 outputs, as the first output signal OUT1, the grayscale voltage VGMA_VH255 corresponding to the first group of data values 8'b11111111 included in the first display data DATA (=ODD1<8:1>).

1-3. In the case that the first group of data values included in the first display data DATA (=ODD1<8:1>) are neither 8'b00000000 nor 8'b11111111

When the first group of data values included in the first display data DATA (=ODD1<8:1>) are neither 8'b00000000 nor 8'b11111111, the first target data value detection circuit 410 generates the first output signal S1 having the low level L, the second target data value detection circuit 420 generates the second output signal S2 having the low level L, and the logic gate circuit 430 implemented as a NOR gate circuit generates the third output signal S3 having the high level H.

In response to the first output signal S1 having the low level L, the second output signal S2 having the low level L, and the third output signal S3 having the high level H, the multiplexer 440 outputs the first group of data values, which are inputted through a third input terminal IN3, to the first data processing circuit 205_1 and the second data processing circuit 205_2.

Only the first data processing circuit 205_1 receives and processes the first display data (DOUT=ODD1<8:0>) including the first group of data values.

2-1. In the case that the first group of data values included in the first display data DATA (=EVEN1<8:1>) are 8'b00000000

When the first group of data values included in the first display data DATA (=EVEN1<8:1>) are 8'b00000000, the first target data value detection circuit 410 generates the first output signal S1 having the high level H, the second target data value detection circuit 420 generates the second output signal S2 having the low level L, and the logic gate circuit 430 implemented as a NOR gate circuit generates the third output signal S3 having the low level L.

In response to the first output signal S1 having the high level H, the second output signal S2 having the low level L, and the third output signal S3 having the low level L, the multiplexer 440 outputs the first reference data REFD1 (=8'b11111111), which is inputted through the first input terminal IN1, as the output data DOUT to the first data processing circuit 205_1 and the second data processing circuit 205_2.

Only the second data processing circuit 205_2 receives and processes the second display data (DOUT=EVEN1<8:0>) including the second group of data values (REFD1=8'b11111111).

For example, even if the second data processing circuit 205_2 receives the second group of data values (REFD1=8'b11111111), the second data processing circuit 205_2 does not output the grayscale voltage VGMA_VL255 corresponding to the second group of data values (REFD1=8'b11111111) as the second output signal OUT2, but outputs the grayscale voltage VGMA_VL0 corresponding to the first group of data values 8'b00000000 as the second output signal OUT2.

In other words, the second data processing circuit 205_2 outputs, as the second output signal OUT2, the grayscale voltage VGMA_VL0 corresponding to the first group of data values 8'b00000000 included in the original first display data DATA (=EVEN1<8:1>).

2-2. In the case that the first group of data values included in the first display data DATA (=EVEN1<8:1>) are 8'b11111111

When the first group of data values included in the first display data DATA (=EVEN1<8:1>) are 8'b11111111, the first target data value detection circuit 410 generates the first output signal S1 having the low level L, the second target data value detection circuit 420 generates the second output signal S2 having the high level H, and the logic gate circuit 430 implemented as a NOR gate circuit generates the third output signal S3 having the low level L.

In response to the first output signal S1 having the low level L, the second output signal S2 having the high level H, and the third output signal S3 having the low level L, the multiplexer 440 outputs the second reference data REFD2 (=8'b00000000), which is inputted through the second input terminal IN2, as the output data DOUT to the first data processing circuit 205_1 and the second data processing circuit 205_2.

Only the second data processing circuit 205_2 receives and processes the second display data (DOUT=EVEN1<8:0>) including the second group of data values (REFD2=8'b00000000).

For example, even if the second data processing circuit 205_2 receives the second group of data values (REFD2=8'b00000000), the second data processing circuit 205_2 does not output the grayscale voltage VGMA_VL0 corresponding to the second group of data values (REFD2=8'b00000000) as the second output signal OUT2, but outputs the grayscale voltage VGMA_VL255 corresponding to the first group of data values 8'b1111111111 as the second output signal OUT2.

In other words, the second data processing circuit 205_2 outputs, as the second output signal OUT2, the grayscale voltage VGMA_VL255 corresponding to the first group of data values 8'b11111111 included in the original first display data DATA (=EVEN1<8:1>).

2-3. In the case that the first group of data values included in the first display data DATA (=EVEN1<8:1>) are neither 8'b00000000 nor 8'b11111111

When the first group of data values are neither 8'b00000000 nor 8'b11111111, the first target data value detection circuit 410 generates the first output signal S1 having the low level L, the second target data value detection circuit 420 generates the second output signal S2 having the low level L, and the logic gate circuit 430 implemented as a NOR gate circuit generates the third output signal S3 having the high level H.

In response to the first output signal S1 having the low level L, the second output signal S2 having the low level L, and the third output signal S3 having the high level H, the multiplexer 440 outputs the first group of data values, which are inputted through the third input terminal IN3, as they are to the first data processing circuit 205_1 and the second data processing circuit 205_2.

Only the second data processing circuit 205_2 receives and processes the first display data (DOUT=EVEN1<8:0>) including the first group of data values.

FIG. 6 is another aspect of display data for describing the operation of the inversion circuit shown in FIG. 4.

The operation of the transmission control circuit 400 will be described with reference to FIGS. 3, 4, and 6, when only one of the target data values is one of data 1 and data 0, and each of the remaining target data values is the other of data 1 and data 0.

For example, it is assumed that the first target data value detection circuit 410 is designed to output the first output signal having the high level only when the first group of data values 8'b00000001 and the target data values 8'b00000001 are the same, and the second target data value detection circuit 420 is designed to output the second output signal having the high level only when the first group of data values 8'b11111110 and the target data values 8'b11111110 are the same. It is also assumed that the first reference data REFD1 is 8'b11111110 and the second reference data REFD2 is 8'b00000001.

Here, when specific data values are inputted to the corresponding detection circuit 410 or 420 and the output signal S1 or S2 having the high level is generated by the corresponding detection circuit 410 or 420, the specific data values are referred to as the target data values.

According to embodiments, the first target data value detection circuit 410 may also be designed to output the first output signal having the high level only when the first group of data values 8'b10000000 and the target data values 8'b10000000 are the same, and the second target data value detection circuit 420 may also be designed to output the second output signal having the high level only when the first group of data values 8'b01111111 and the target data values 8'b01111111 are the same. In this case, the first reference data REFD1 may be set to 8'b01111111, and the second reference data REFD2 may be set to 8'b10000000.

3-1. When the first group of data values included in the first display data DATA (=ODD1<8:1>) are 8'b00000001

The first target data value detection circuit 410 outputs the first output signal S1 having the high level H using the first group of data values 8'b00000001.

The second target data value detection circuit 420 outputs the second output signal S2 having the high level H using the first group of data values 8'b11111110.

When the first group of data values are 8'b00000001, the first target data value detection circuit 410 generates the first output signal S1 having the high level H, the second target data value detection circuit 420 generates the second output signal S2 having the low level L, and the logic gate circuit 430 implemented as a NOR gate circuit generates the third output signal S3 having the low level L.

In response to the first output signal S1 having the high level H, the second output signal S2 having the low level L, and the third output signal S3 having the low level L, the multiplexer 440 outputs the first reference data REFD1 (=8'b11111110), which is inputted through the first input terminal IN1, as the output data DOUT to the first data processing circuit 205_1 and the second data processing circuit 205_2.

Only the first data processing circuit 205_1 receives and processes the second display data (DOUT=ODD1<8:0>) including the second group of data values (REFD1=8'b11111110).

3-2. In the case that the first group of data values included in the first display data DATA (=ODD1<8:1>) are 8'b11111110

When the first group of data values are 8'b11111110, the first target data value detection circuit 410 generates the first output signal S1 having the low level L, the second target data value detection circuit 420 generates the second output signal S2 having the high level H, and the logic gate circuit 430 implemented as a NOR gate circuit generates the third output signal S3 having the low level L.

In response to the first output signal S1 having the low level L, the second output signal S2 having the high level H, and the third output signal S3 having the low level L, the multiplexer 440 outputs the second reference data REFD2 (=8'b00000001), which is inputted through the second input terminal IN2, as the output data DOUT to the first data processing circuit 205_1 and the second data processing circuit 205_2.

Only the first data processing circuit 205_1 receives and processes the second display data (DOUT=ODD1<8:0>) including the second group of data values (REFD2=8'b00000001).

3-3. In the case that the first group of data values included in the first display data DATA (=ODD1<8:1>) are neither 8'b00000001 nor 8'b11111110

When the first group of data values are neither 8'b00000001 nor 8'b11111110, the first target data value detection circuit 410 generates the first output signal S1 having the low level L, the second target data value detection circuit 420 generates the second output signal S2 having the low level L, and the logic gate circuit 430 implemented as a NOR gate circuit generates the third output signal S3 having the high level H.

In response to the first output signal S1 having the low level L, the second output signal S2 having the low level L, and the third output signal S3 having the high level H, the multiplexer 440 outputs the first group of data values, which are inputted through the third input terminal IN3, to the first data processing circuit 205_1 and the second data processing circuit 205_2.

Only the first data processing circuit 205_1 receives and processes the first display data (DOUT=ODD1<8:0>) including the first group of data values.

Figure 7:
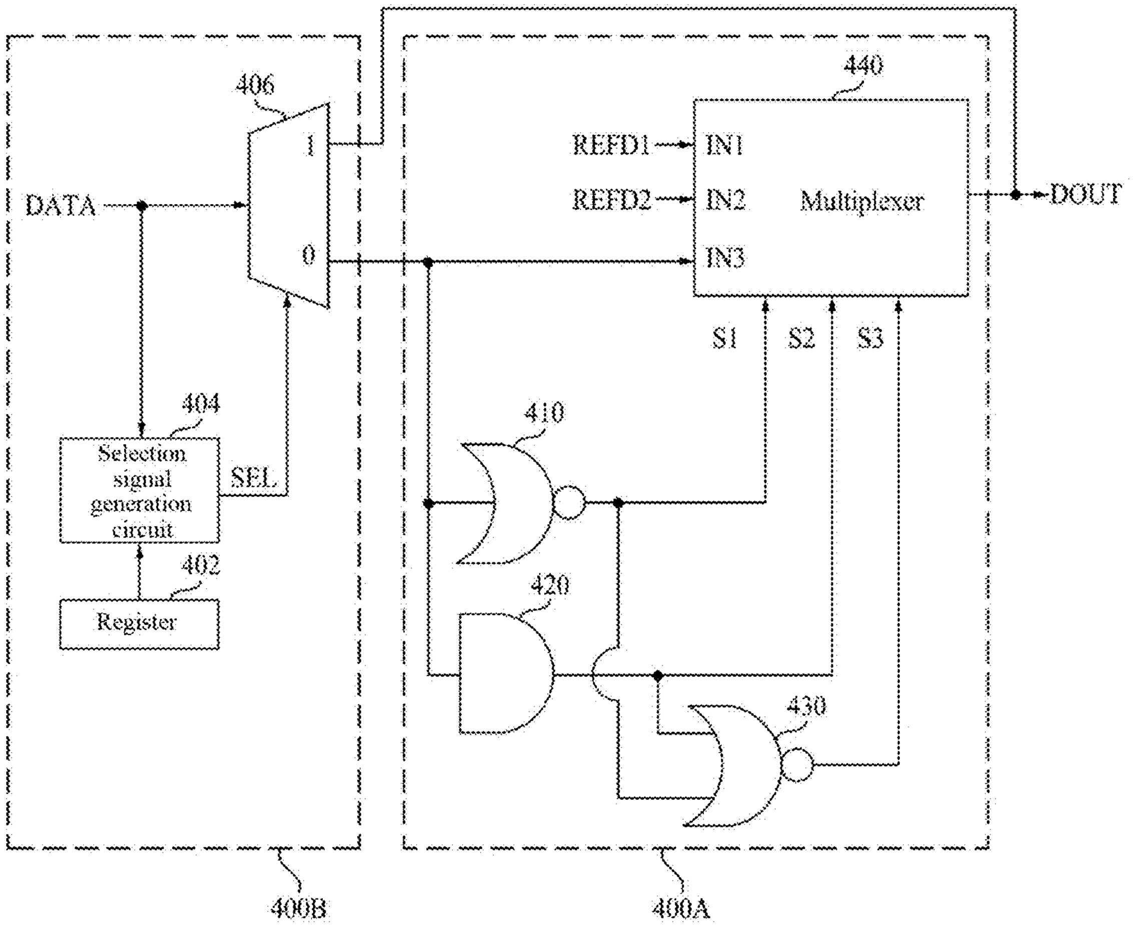
FIG. 7 is a diagram illustrating an example of a transmission control circuit that includes a determination circuit and an inversion circuit included in the source driver IC of FIG. 2.

FIG. 7 is a diagram illustrating an example of a transmission control circuit including a determination circuit and an inversion circuit included in the source driver IC of FIG. 2, and FIG. 8A is a table illustrating the operation of a selection signal generation circuit shown in FIG. 7.

Referring to FIG. 7, the transmission control circuit 400 includes the determination circuit 400B and the inversion circuit 400A.

The determination circuit 400B determines whether the first display data is of an inversion target data type. The determination circuit 400B includes a register 402, a selection signal generation circuit 404, and a demultiplexer 406.

The register 402 stores information indicating (representing) whether the inversion target data type corresponds to odd-numbered data or even-numbered data.

The selection signal generation circuit 404 generates a selection signal SEL based on the information stored in the register 402 and whether the display data DATA is odd-numbered data ODDi<8:1> or even-numbered data EVENi<8:1>.

As shown in FIG. 8A, when the inversion target data type is odd-numbered data and the display data DATA is odd-numbered data ODDi<8:1>, the selection signal generation circuit 404 generates the selection signal SEL having the low level L, and when the inversion target data type is odd-numbered data and the display data DATA is even-numbered data EVENi<8:1>, the selection signal generation circuit 404 generates the selection signal SEL having the high level H.

In another example, when the inversion target data type is even-numbered data and the display data DATA is odd-numbered data ODDi<8:1>, the selection signal generation circuit 404 generates the selection signal SEL having the high level H, and when the inversion target data type is even-numbered data and the display data DATA is even-numbered data EVENi<8:1>, the selection signal generation circuit 404 generates the selection signal SEL having the low level L.

When the selection signal SEL is at the high level H, the demultiplexer 406 bypasses the display data DATA to the first data processing circuit 205_1 and the second data processing circuit 205_2.

However, when the selection signal SEL is at the low level L, the demultiplexer 406 transmits the display data DATA to the inversion circuit 400A.

The inversion circuit 400A includes the first target data value detection circuit 410, the second target data value detection circuit 420, the logic gate circuit 430, and the multiplexer 440, and is identical to that shown in FIG. 4. Therefore, a detailed description thereof is omitted.

Figure 12:
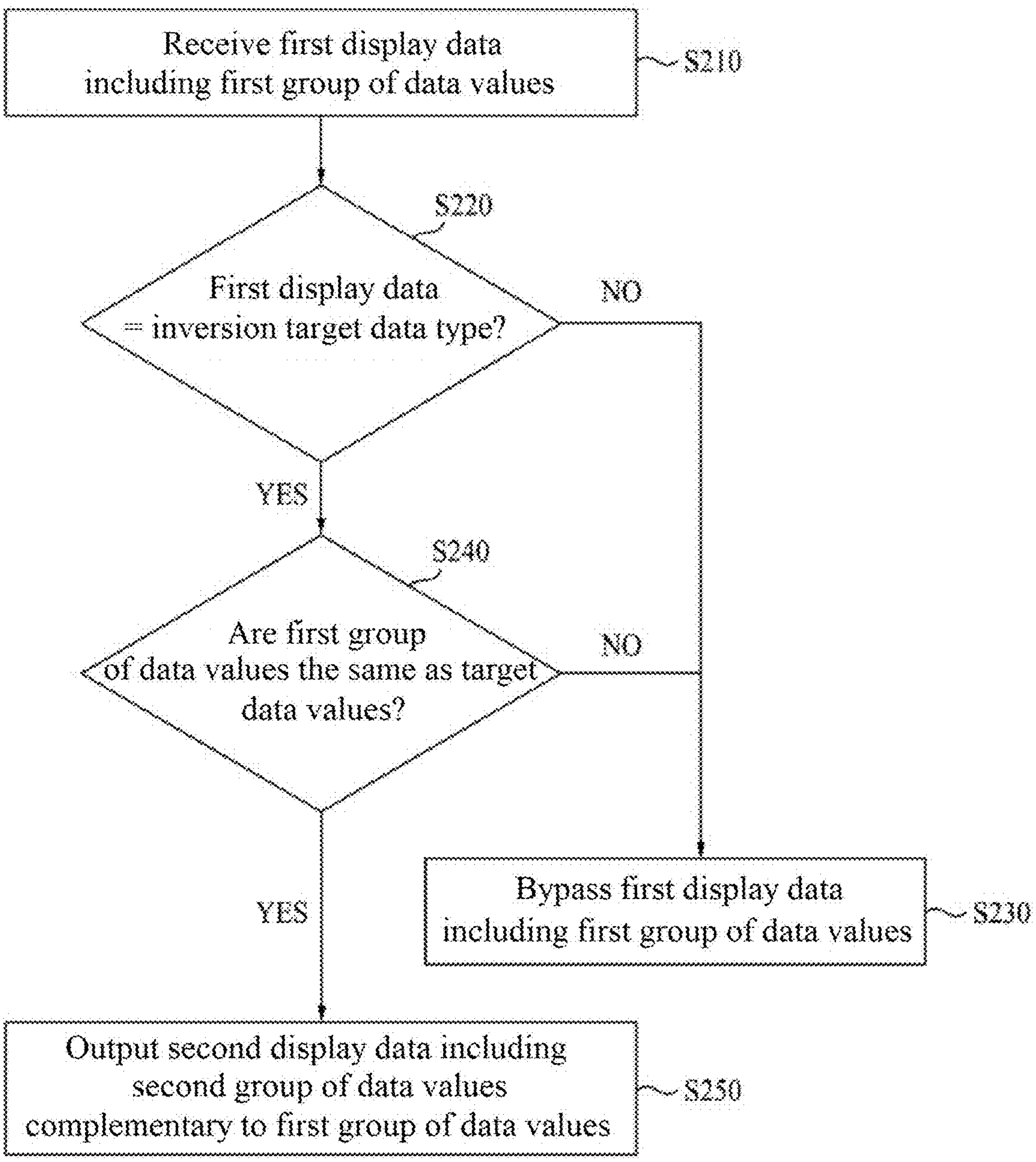
FIG. 12 is a flowchart illustrating the operation of the transmission control circuit shown in FIG. 7.

FIG. 12 is a flowchart illustrating the operation of the transmission control circuit shown in FIG. 7.

The operation of the transmission control circuit 400 is described with reference to FIGS. 3, 7, 8A, 8B, and 12. In this case, it is assumed that the inversion target data type is odd-numbered data, and the first target data value detection circuit 410 is designed to output the first output signal S1 having the high level only when the first group of data values 8'b00000000 are inputted, the second target data value detection circuit 420 is designed to output the second output signal having the high level only when the first group of data values 8'b11111111 are inputted, the first reference data REFD1 is 8'b11111111, and the second reference data REFD2 is 8'b00000000.

First, the selection signal generation circuit 404 receives the first display data DATA, i.e., first odd-numbered data ODD1<8:1>, including the first group of data values 8'b00000000 from the reception circuit 203 (S210).

The selection signal generation circuit 404 determines whether the first display data DATA (=ODD1<8:1>=8'b00000000) is of the inversion target data type (S220).

When the first display data DATA (=ODD1<8:1>=8'b00000000) is of the inversion target data type, that is, when the first display data DATA (=ODD1<8:1>) is odd-numbered data (YES in step S220), the selection signal generation circuit 404 generates the selection signal SEL having the low level L.

The demultiplexer 406 transmits the first display data DATA (=ODD1<8:1>=8'b00000000) to the inversion circuit 400A in response to the selection signal SEL having the low level L.

4-1. In the case that the first group of data values included in the first display data DATA (=ODD1<8:1>) are 8'b00000000

When the first group of data values 8'b00000000 and the target data values 8'b00000000 are the same, that is, when the first group of data values 8'b00000000 are received (YES in step S240), the first target data value detection circuit 410 outputs the first output signal S1 having the high level H, the second target data value detection circuit 420 generates the second output signal S2 having the low level L, and the logic gate circuit 430 implemented as a NOR gate circuit generates the third output signal S3 having the low level L.

In response to the first output signal S1 having the high level H, the second output signal S2 having the low level L, and the third output signal S3 having the low level L, the multiplexer 440 outputs the first reference data REFD1 (=8'b11111111), which is inputted through the first input terminal IN1, as the output data DOUT to the first data processing circuit 205_1 and the second data processing circuit 205_2 (S250).

Only the first data processing circuit 205_1 receives and processes the second display data (DOUT=ODD1<8:0>) including the second group of data values (REFD1=8'b11111111).

In another example, the selection signal generation circuit 404 receives the first display data DATA (=ODD1<8:1>) including the first group of data values 8'b11111111 from the reception circuit 203 (S210).

The selection signal generation circuit 404 determines whether the first display data DATA (=ODD1<8:1>=8'b11111111) is of the inversion target data type (S220).

When the first display data DATA (=ODD1<8:1>=8'b11111111) is of the inversion target data type, that is, when the first display data DATA (=ODD1<8:1>=8'b11111111) is odd-numbered data (YES in step S220), the selection signal generation circuit 404 generates the selection signal SEL having the low level L.

The demultiplexer 406 transmits the first display data DATA (=ODD1<8:1>=8'b11111111) to the inversion circuit 400A in response to the selection signal SEL having the low level L.

4-2. In the case that the first group of data values included in the first display data DATA (=ODD1<8:1>) are 8'b11111111

When the first group of data values 8'b11111111 and the target data values 8'b11111111 are the same, that is, when the first display data DATA (=ODD1<8:1>=8'b11111111) is received (YES in step S240), the first target data value detection circuit 410 outputs the first output signal S1 having the low level L, the second target data value detection circuit 420 generates the second output signal S2 having the high level H, and the logic gate circuit 430 implemented as a NOR gate circuit generates the third output signal S3 having the low level L.

In response to the first output signal S1 having the low level L, the second output signal S2 having the high level H, and the third output signal S3 having the low level L, the multiplexer 440 outputs the second reference data REFD2 (=8'b00000000), which is inputted through the second input terminal IN2, as the output data DOUT to the first data processing circuit 205_1 and the second data processing circuit 205_2 (S250).

Only the first data processing circuit 205_1 receives and processes the second display data (DOUT=ODD1<8: 0>=00000000) including the second group of data values (REFD2=8'b00000000).

In another example, the selection signal generation circuit 404 receives the first display data DATA (=ODD1<8:1>) including the first group of data values (e.g., neither 8'b00000000 nor 8'b11111111) from the reception circuit 203 (S210).

The selection signal generation circuit 404 determines whether the first display data DATA (=ODD1<8:1>) is of the inversion target data type (S220).

When the first display data DATA (=ODD1<8:1>) is of the inversion target data type, that is, when the first display data DATA (=ODD1<8:1>) is odd-numbered data (YES in step S220), the selection signal generation circuit 404 generates the selection signal SEL having the low level L.

The demultiplexer 406 transmits the first display data DATA (=ODD1<8:1>) to the inversion circuit 400A in response to the selection signal SEL having the low level L.

4-3. In the case that the first group of data values included in the first display data DATA (=ODD1<8:1>) are neither 8'b00000000 nor 8'b11111111

Since the first group of data values and the target data values are not the same (NO in step S240), the first target data value detection circuit 410 generates the first output signal S1 having the low level L, the second target data value detection circuit 420 generates the second output signal S2 having the low level L, and the logic gate circuit 430 implemented as a NOR gate circuit generates the third output signal S3 having the high level H.

In response to the first output signal S1 having the low level L, the second output signal S2 having the low level L, and the third output signal S3 having the high level H, the multiplexer 440 bypasses the first group of data values (neither 8'b00000000 nor 8'b11111111), which are inputted through the third input terminal IN3, as they are to the first data processing circuit 205_1 and the second data processing circuit 205_2 (S230).

Only the first data processing circuit 205_1 receives and processes the first display data (DOUT=ODD1<8:0>) including the first group of data values.

In another example, the selection signal generation circuit 404 receives the first display data DATA, i.e., first even-numbered data EVEN1<8:1>, including the first group of data values from the reception circuit 203 (S210).

The selection signal generation circuit 404 determines whether the first display data DATA (=EVEN1<8:1>) is of the inversion target data type (S220).

When the first display data DATA (=EVEN1<8:1>) is not of the inversion target data type, that is, when the first display data DATA (=EVEN1<8:1>) is not odd-numbered data (NO in step S220), the selection signal generation circuit 404 generates the selection signal SEL having the high level H.

The demultiplexer 406 bypasses the first display data DATA (=EVEN1<8:1>) as it is to the first data processing circuit 205_1 and the second data processing circuit 205_2 in response to the selection signal SEL having the high level H (S230).

Only the second data processing circuit 205_2 receives and processes the first display data (DOUT=EVEN1<8:0>) including the first group of data values.

FIG. 8B is a table illustrating input and output signals of each of the first data processing circuit and the second data processing circuit shown in FIG. 2.

When the inversion target data type is even-numbered data EVENi<N:1> and the target data values are 8'b00000000 and 8'b11111111, the transmission control circuit 400 bypasses the odd-numbered data ODDi<N:1> to the first data processing circuit 205_1.

As shown in FIG. 8B, the first data processing circuit 205_1 outputs, as the first output signal OUT1, a grayscale voltage corresponding to the first group of data values VGMA_VH<0:255> included in the odd-numbered data ODDi<N:1> among the first group of grayscale voltages VGMA_VH<0:255> (S250).

However, when the even-numbered data EVENi<N:1> including the first group of data values 8'b00000000 is inputted, the transmission control circuit 400 inverts the first group of data values into the second group of data values 8'b11111111, and then transmits the even-numbered data EVENi<N:1> including the second group of data values 8'b11111111 to the second data processing circuit 205_2.

However, even if the even-numbered data EVENi<N:1> including the second group of data values 8'b11111111 is transmitted to the second data processing circuit 205_2, the second DAC 240_2 of the second data processing circuit 205_2 does not output, as the second output signal OUT2, the grayscale voltage VGMA_VL255 corresponding to the second group of data values 8'b11111111 among the second group of grayscale voltages VGMA_VL<0:255>, and output, as the second output signal OUT2, the grayscale voltage VGMA_VL0 corresponding to the first group of data values 8'b00000000 among the second group of grayscale voltages VGMA_VL<0:255> (S250)).

To this end, the second DAC 240_2 may be manufactured such that the grayscale voltage VGMA_VL0 is inputted into an internal path for the output of the grayscale voltage VGMA_VL255. Specifically, the second DAC 240_2 may be designed such that the grayscale voltage VGMA_VL0 is inputted to an input terminal where the grayscale voltage VGMA_VL255 is inputted in a typical DAC, and the grayscale voltage VGMA_VL255 is inputted to an input terminal where the grayscale voltage VGMA_VL0 is inputted.

When the even-numbered data EVENi<N:1> including the first group of data values 8'b11111111 is inputted, the transmission control circuit 400 inverts the first group of data values 8'b11111111 into the second group of data values 8'b00000000, and then transmits the even-numbered data EVENi<N:1> including the second group of data values 8'b00000000 to the second data processing circuit 205_2.

Even if the even-numbered data EVENi<N:1> including the second group of data values 8'b00000000 is transmitted to the second data processing circuit 205_2, the second DAC 240_2 of the second data processing circuit 205_2 does not output, as the second output signal OUT2, the grayscale voltage VGMA_VL0 corresponding to the second group of data values 8'b00000000 among the second group of grayscale voltages VGMA_VL<0:255>, but outputs, as the second output signal OUT2, the grayscale voltage VGMA_VL255 corresponding to the first group of data values 8'b1111111111 among the second group of grayscale voltages VGMA_VL<0:255> (S250).

As described above, since the second DAC 240_2 is designed such that the grayscale voltage VGMA_VL255 is inputted to an input terminal where the grayscale voltage VGMA_VL0 should be inputted in a typical DAC structure, even when the second group of data values 8'b00000000 are inputted, the grayscale voltage VGMA_VL255, which is matched to the path of the grayscale voltage VGMA_VL0, may be outputted as the second output signal OUT2.

When the even-numbered data EVENi<N:1> including the first group of data values 8'b00000001 or 11111110, that are neither 8'b00000000 nor 8'b11111111, is inputted, the even-numbered data EVENi<N:1> including the first group of data values 8'b00000001 or 11111110 outputted from the transmission control circuit 400 is transmitted to the second data processing circuit 205_2.

The second DAC 240_2 of the second data processing circuit 205_2 outputs, as the second output signal OUT2, the grayscale voltage VGMA_VL1 or VGMA_VL254 corresponding to the first group of data values 8'b00000001 or 11111110 among the second group of grayscale voltages VGMA_VL<0:255> (S250).

As described above, each of the DACs 240_1 and 240_2 of FIG. 2 is designed to have a structure capable of performing the step S150 of FIG. 11 and the step S260 of FIG. 12.

Figure 9:
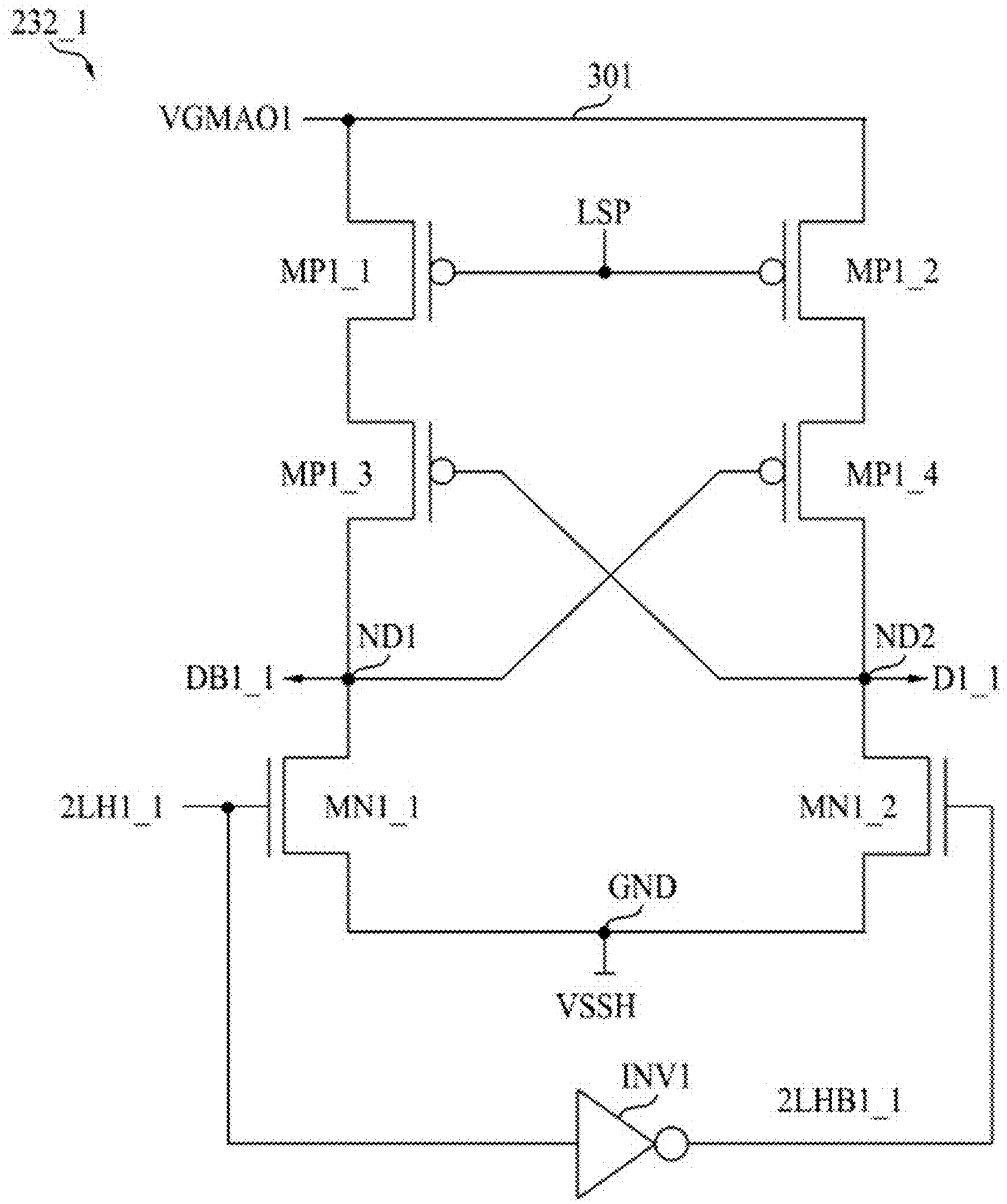
FIG. 9 is a circuit diagram of a first level shifter included in the source driver IC of FIG. 2.

FIG. 9 is a circuit diagram of a first level shifter included in the source driver IC of FIG. 2.

The first level shifter circuit 230_1 includes a plurality of first level shifters 232_1 to 232_8. Since the structures and operations of the first level shifters 232_1 to 232_8 are the same, the structure and operation of the first level shifter 232_1 are representatively described with reference to FIG. 9.

Transistors MP1_1, MP1_3, and MN1_1 are connected in series between a first grayscale voltage transmission line 301 for transmitting a first intermediate grayscale voltage VGMAO1 (=VGMA_VH255) and ground GND for supplying a ground voltage VSSH, and transistors MP1_2, MP1_4, and MN1_2 are connected in series between the first grayscale voltage transmission line 301 and the ground GND. As shown in FIG. 8C, the first intermediate grayscale voltage VGMAO1 may be a voltage closest to the first operating voltage VDDH (or a voltage that is lower than the level of the first operating voltage VDDH and has the smallest level difference from the first operating voltage VDDH).

Since a bias voltage LSP having the low level is supplied to each of the gate of a first PMOS transistor MP1_1 and the gate of a second PMOS transistor MP1_2, the first and second PMOS transistors MP1_1 and MP1_2 are turned on. The first and second PMOS transistors MP1_1 and MP1_2 may be maintained in a continuously turned-on state by the bias voltage LSP supplied to their gates. As the bias voltage LSP is supplied to the gate of the first PMOS transistor MP1_1 and the gate of the second PMOS transistor MP1_2 to turn on the first and second PMOS transistors MP1_1 and MP1_2, the current flowing through a third PMOS transistor MP1_3 and a fourth PMOS transistor MP1_4 is limited.

The gate of the third PMOS transistor MP1_3 is connected to a second node ND2, the first terminal of the third PMOS transistor MP1_3 is connected to a first node ND1, and the second terminal of the third PMOS transistor MP1_3 is connected to the first PMOS transistor MP1_1. The gate of the fourth PMOS transistor MP1_4 is connected to the first node ND1, the first terminal of the fourth PMOS transistor MP1_4 is connected to the second node ND2, and the second terminal of the fourth PMOS transistor MP1_4 is connected to the second PMOS transistor MP1_2.

The output signal (also referred to as "first input data" or "first bit") 2LH1_1 of the second latch 222_1 included in the second latch circuit 220_1 is inputted to the gate of a first NMOS transistor MN1_1, a first inverter INV1 inverts the output signal 2LH1_1 of the second latch 222_1, and an inverted output signal 2LHB1_1 is inputted to the gate of a second NMOS transistor MN1_2.

For example, when the level of the signal 2LH1_1 inputted to the gate of the first NMOS transistor MN1_1 is high and the level of the signal 2LHB1_1 inputted to the gate of the second NMOS transistor MN1_2 is low, the first NMOS transistor MN1_1 is turned on and the second NMOS transistor MN1_2 is turned off.

When the first NMOS transistor MN1_1 is turned on, a voltage DB1_1 at the first node ND1 is pulled down to the ground voltage VSSH and the fourth PMOS transistor MP1_4 is turned on, causing a voltage D1_1 at the second node ND2 to be pulled up to the level of the first operating voltage (VGMAO1=VGMA_VH255). Accordingly, the third PMOS transistor MP1_3 is turned off, and thus the voltage DB1_1 at the first node ND1 maintains the ground voltage VSSH.

Conversely, when the level of the signal 2LH1_1 inputted to the gate of the first NMOS transistor MN1_1 is low and the level of the signal 2LHB1_1 inputted to the gate of the second NMOS transistor MN1_2 is high, the first NMOS transistor MN1_1 is turned off and the second NMOS transistor MN1_2 is turned on.

When the second NMOS transistor MN1_2 is turned on, the voltage D1_1 at the second node ND2 is pulled down to the ground voltage VSSH and the third PMOS transistor MP1_3 is turned on, causing the voltage DB1_1 at the first node ND1 to be pulled up to the level of the first operating voltage (VGMAO1=VGMA_VH255). Accordingly, the fourth PMOS transistor MP1_4 is turned off, and thus the voltage D1_1 at the second node ND2 maintains the ground voltage VSSH.

The voltage level DB1_1 at the first node ND1 is complementary to the voltage level D1_1 at the second node ND2.

The output voltage swing range of the voltage levels DB1_1 and D1_1 is between the highest grayscale voltage VGMA_VH255 (=VGMAO1) among the first group of grayscale voltages VGMA_VH0 to VGMA_VH255 and the ground voltage VSSH.

The first level shifters 232_1 to 232_8 output complementary signal pairs <D1_1, DB1_1> to <D1_8, DB1_8> to the first DAC 240_1.

For example, the voltage swing range of the output signals D1_1 to D1_8 of the first level shifters 232_1 to 232_8 is greater than the voltage swing range of the input/output signals of each of the latches 212_1 to 212_8 and 222_1 to 222_8.

Figure 10:
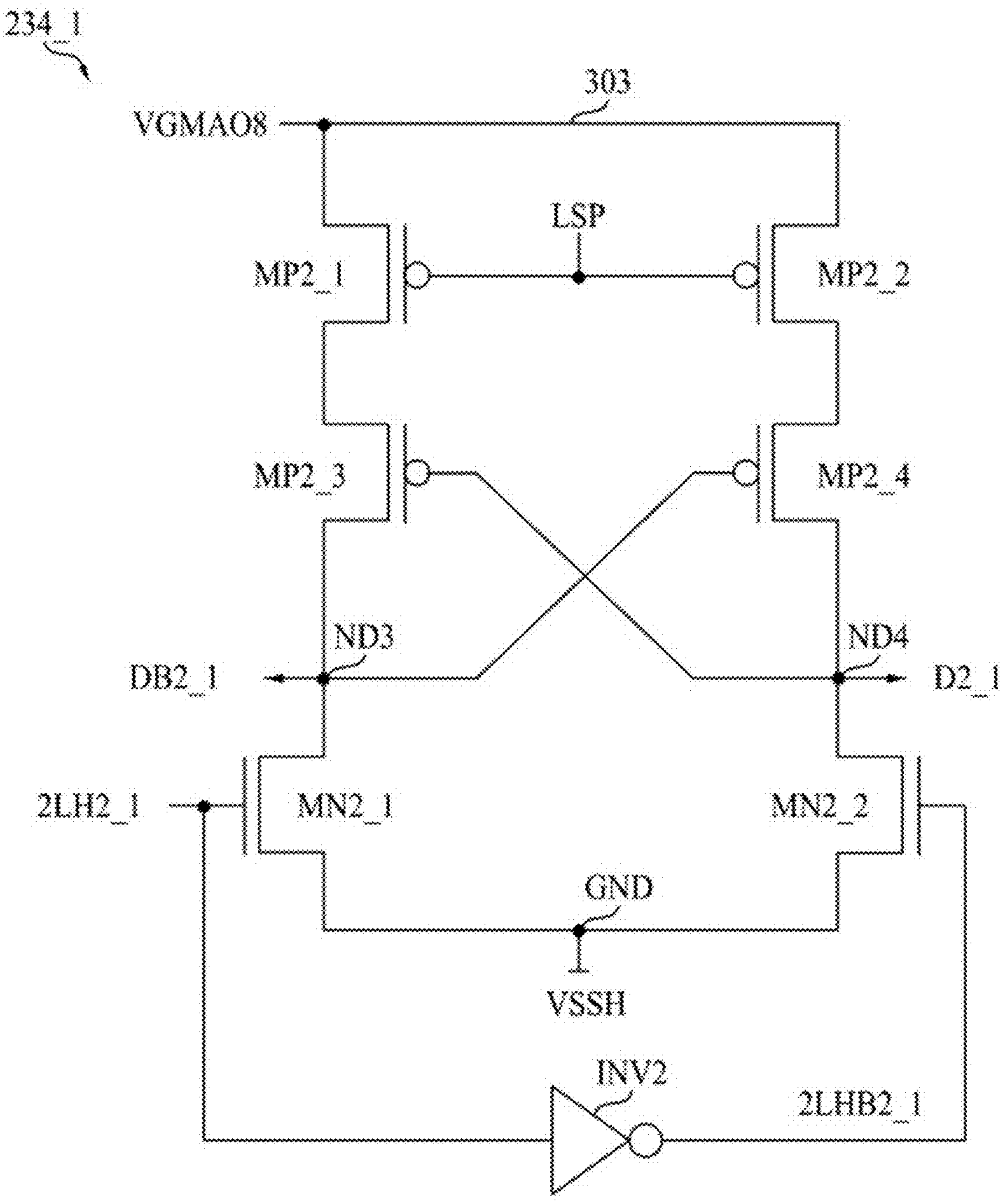
FIG. 10 is a circuit diagram of a second level shifter included in the source driver IC of FIG. 2.

FIG. 10 is a circuit diagram of a second level shifter included in the source driver IC of FIG. 2.

The second level shifter circuit 230_2 includes a plurality of second level shifters 234_1 to 234_8. Since the structures and operations of the second level shifters 234_1 to 234_8 are the same, the structure and operation of the second level shifter 234_1 are representatively described with reference to FIG. 10.

For example, when describing two level shifters **232_*j* and 234_*j* (where 1≤j≤8), the first level shifter may refer to the level shifter 232_*j*, and the second level shifter may refer to the level shifter 234_*j***.

Each of the second level shifters 234_1 to 234_8 and each of the first level shifters 232_1 to 232_8 operate independently of each other. Furthermore, the first level shifters 232_1 to 232_8 operate independently of each other, and the second level shifters 234_1 to 234_8 operate independently of each other.

For example, the output signal of any one of the first level shifters 232_1 to 232_8 has no effect on the input signal of each of the remaining level shifters.

As shown in FIG. 8C, transistors MP2_1, MP2_3, and MN2_1 are connected in series between a second grayscale voltage transmission line 303 for transmitting a second intermediate grayscale voltage VGMA08 (=VGMA_VL0) and the ground GND for supplying the ground voltage VSSH, and transistors MP2_2, MP2_4, and MN2_2 are connected in series between the second grayscale voltage transmission line 303 and the ground GND. The second intermediate grayscale voltage VGMA08 may be a voltage closest to the second operating voltage HVDD (=0.5 VDDH) (or a voltage that is lower than the level of the second operating voltage HVDD and has the smallest level difference from the second operating voltage HVDD).

Since the bias voltage LSP having the low level is supplied to each of the gate of a first PMOS transistor MP2_1 and the gate of a second PMOS transistor MP2_2, the first and second PMOS transistors MP2_1 and MP2_2 are turned on. The first and second PMOS transistors MP2_1 and MP2_2 may be maintained in a continuously turned-on state by the bias voltage LSP supplied to their gates. As the bias voltage LSP is supplied to the gate of the first PMOS transistor MP2_1 and the gate of the second PMOS transistor MP2_2 to turn on the first and second PMOS transistors MP2_1 and MP2_2, the current flowing through a third PMOS transistor MP2_3 and a fourth PMOS transistor MP2_4 is limited.

The gate of the third PMOS transistor MP2_3 is connected to a fourth node ND4, the first terminal of the third PMOS transistor MP2_3 is connected to a third node ND3, and the second terminal of the third PMOS transistor MP2_3 is connected to the first PMOS transistor MP2_1. The gate of the fourth PMOS transistor MP2_4 is connected to the third node ND3, the first terminal of the fourth PMOS transistor MP2_4 is connected to the fourth node ND4, and the second terminal of the fourth PMOS transistor MP2_4 is connected to the second PMOS transistor MP2_2.

The output signal (also referred to as "second input data" or "second bit") 2LH2_1 of the fourth latch 224_1 included in the fourth latch circuit 220_2 is inputted to the gate of a first NMOS transistor MN2_1, a second inverter INV2 inverts the output signal 2LH2_1 of the fourth latch 224_1, and an inverted output signal 2LHB2_1 is inputted to the gate of a second NMOS transistor MN2_2.

For example, when the level of the signal 2LH2_1 inputted to the gate of the first NMOS transistor MN2_1 is high and the level of the signal 2LHB2_1 inputted to the gate of the second NMOS transistor MN2_2 is low, the first NMOS transistor MN2_1 is turned on and the second NMOS transistor MN2_2 is turned off.

When the first NMOS transistor MN2_1 is turned on, a voltage DB2_1 at the third node ND3 is pulled down to the ground voltage VSSH, and the fourth PMOS transistor MP2_4 is turned on, causing a voltage D2_1 at the fourth node ND4 to be pulled up to the level of the second operating voltage (VGMAO8). Accordingly, the third PMOS transistor MP2_3 is turned off, and thus the voltage DB2_1 at the third node ND3 maintains the ground voltage VSSH.

Conversely, when the level of the signal 2LH2_1 inputted to the gate of the first NMOS transistor MN2_1 is low and the level of the signal 2LHB2_1 inputted to the gate of the second NMOS transistor MN2_2 is high, the first NMOS transistor MN2_1 is turned off and the second NMOS transistor MN2_2 is turned on.

When the second NMOS transistor MN2_2 is turned on, the voltage D2_1 at the fourth node ND4 is pulled down to the ground voltage VSSH, and the third PMOS transistor MP2_3 is turned on, causing the voltage DB2_1 at the third node ND3 to be pulled up to the level of the second operating voltage (VGMAO8). Accordingly, the fourth PMOS transistor MP2_4 is turned off, and thus the voltage D2_1 at the fourth node ND4 maintains the ground voltage VSSH.

The voltage level DB2_1 at the third node ND3 is complementary to the voltage level D2_1 at the fourth node ND4.

The output voltage swing range of the voltage levels DB2_1 and D2_1 is between the highest grayscale voltage VGMA_VL0 (=VGMAO8) among the second group of grayscale voltages VGMA_VL0 to VGMA_VL255 and the ground voltage VSSH As described with reference to FIG. 10, the second level shifters 234_1 to 234_8 output complementary signal pairs <D2_1, DB2_1> to <D2_8, DB2_8> to the second DAC 240_2.

For example, the voltage swing range of the output signals D2_1 to D2_8 of the second level shifters 234_1 to 234_8 is greater than the voltage swing range of the input/output signals of each of the latches 214_1 to 214_8 and 224_1 to 224_8, and smaller than the voltage swing range of the output signals D1_1 to D1_8 of the first level shifters 232_1 to 232_8.

As shown in FIG. 2, the first level shifters 232_1 to 232_8 operate independently of the second level shifters 234_1 to 234_8.

Referring back to FIG. 2, the first DAC 240_1 outputs any one of the first group of grayscale voltages VGMA_VH0 to VGMA_VH255 as a first output signal DAC1O in response to the complementary signal pairs <D1_1, DB1_1> to <D1_8, DB1_8> outputted from the first level shifters 232_1 to 232_8.

For example, when the 8-bit parallel data D1_1 to D1_8 outputted from the first level shifter circuit 230_1 is 00000000, the first DAC 240_1 outputs a $1^{st}$ grayscale voltage VGMA_VH0 as the first output signal DAC1O, and when the 8-bit parallel data D1_1 to D1_8 outputted from the first level shifter circuit 230_1 is 00000001, the first DAC 240_1 outputs a $2^{nd}$ grayscale voltage VGMA_VH1 as the first output signal DAC1O. When the 8-bit parallel data D1_1 to D1_8 outputted from the first level shifter circuit 230_1 is 11111110, the first DAC 240_1 outputs a $255^{th}$ grayscale voltage VGMA_VH254 as the first output signal DAC1O, and when the 8-bit parallel data D1_1 to D1_8 outputted from the first level shifter circuit 230_1 is 11111111, the first DAC 240_1 outputs a $256^{th}$ grayscale voltage VGMA_VH255 as the first output signal DAC1O.

The first output buffer 250_1 buffers the first output signal DAC1O of the first DAC 240_1 and outputs the buffered first output signal OUT1 to at least one of the first data lines DL1.

Referring to FIG. 2, the second DAC 240_2 outputs any one of the second group grayscale voltages VGMA_VL0 to VGMA_VL255 as a second output signal DAC2O in response to the complementary signal pairs <D2_1, DB2_1> to <D2_8, DB2_8> outputted from the second level shifters 234_1 to 234_8.

For example, when the 8-bit parallel data D2_1 to D2_8 outputted from the second level shifter circuit 230_2 is 00000000, the second DAC 240_2 outputs a $1^{st}$ grayscale voltage VGMA_VL0 as the second output signal DAC2O, and when the 8-bit parallel data D2_1 to D2_8 outputted from the second level shifter circuit 230_2 is 00000001, the second DAC 240_2 outputs a $2^{nd}$ grayscale voltage VGMA_VL1 as the second output signal DAC2O. When the 8-bit parallel data D2_1 to D2_8 outputted from the second level shifter circuit 230_2 is 11111110, the second DAC 240_2 outputs a $255^{th}$ grayscale voltage VGMA_VL254 as the second output signal DAC2O, and when the 8-bit parallel data D2_1 to D2_8 outputted from the second level shifter circuit 230_2 is 11111111, the second DAC 240_2 outputs a $256^{th}$ grayscale voltage VGMA_VL255 as the second output signal DAC2O.

The second output buffer 250_2 buffers the second output signal DAC2O of the second DAC 240_2 and outputs the buffered second output signal OUT2 to another one of the first data lines DL1.

According to the above-described aspect, when the first group of data values are the same as the target data values, the first DAC 240_1 or the second DAC 240_2 outputs a grayscale voltage corresponding to the first group of data values instead of a grayscale voltage corresponding to the second group of data values, even if the first group of data values are changed to the second group of data values. In this case, since the first DAC 240_1 or the second DAC 240_2 is manufactured such that the grayscale voltage VGMA_VH0 or VGMA_VL0 is inputted into an internal path for the output of the grayscale voltage VGMA_VH255 or VGMA_VL255, and the grayscale voltage VGMA_VH255 or VGMA_VL255 is inputted to the internal path for the output of the grayscale voltage VGMA_VH0 or VGMA_VL0, even if the data values are inverted, the DAC outputs a grayscale voltage corresponding to the original data value, and the number of transistors requiring state transitions may be reduced as the display data toggles.

A grayscale voltage corresponding to the second display data including the second group of data values is outputted instead of a grayscale voltage corresponding to the first display data including the first group of data values.

Therefore, the peak current generated due to the state transitions of the transistors in the first DAC 240_1 or the second DAC 240_2 is reduced, thereby allowing the load balancing in the first DAC 240_1 or the second DAC 240_2 to be appropriately adjusted.

Those skilled in the art to which the present disclosure belongs will understand that the present disclosure described above may be implemented in other specific forms without changing its technical idea or essential features.

Therefore, it should be understood that the embodiments described above are illustrative in all aspects and do not limit the present disclosure. The scope of the present disclosure is represented by the following claims rather than the above detailed description, and it should be construed that all changes or modifications derived from the meaning and scope of the claims and their equivalent concepts are included within the scope of the present disclosure.

The invention claimed is:

1. A display driving device comprising:

a reception circuit configured to receive first display data including a first group of data values;

a transmission control circuit configured to output the first display data or second display data including a second group of data values based on a comparison result between the first group of data values and target data values; and a data processing circuit configured to process the first display data or the second display data outputted from the transmission control circuit, wherein the transmission control circuit includes an inversion circuit configured to bypass the first display data to the data processing circuit when the first group of data values are not respectively the same as the target data values, to convert the first group of data values into the second group of data values that are respectively complementary to the first group of data values when the first group of data values are respectively the same as the target data values; and to output the second display data including the second group of data values to the data processing circuit.

2. The display driving device of claim 1, wherein the target data values are equal to each other.

3. A display device comprising the display driving device of claim 2.

4. The display driving device of claim 1, wherein:

only one of the target data values is one of data 1 and data 0, and each of the remaining target data values is the other of data 1 and data 0.

5. A display device comprising the display driving device of claim 4.

6. The display driving device of claim 1, wherein the inversion circuit includes:

a first NOR gate circuit configured to output a first output signal at a high level when each of the first group of data values is data 0;

an AND gate circuit configured to output a second output signal at a high level when each of the first group of data values is data 1;

a second NOR gate circuit configured to output a third output signal at a high level when levels of the first and second output signals are the same, and to output the third output signal at a low level when the levels of the first and second output signals are not the same; and a multiplexer configured to output the second display data in which each of the second group of data values is data 1 in response to the first output signal at a high level, the second output signal at a low level, and the third output signal at a low level, to output the second display data in which each of the second group of data values is data 0 in response to the first output signal at a low level, the second output signal at a high level, and the third output signal at a low level, and to output the first display data in response to the first output signal at a low level, the second output signal at a low level, and the third output signal at a high level.

7. A display device comprising the display driving device of claim 6.

8. The display driving device of claim 1, wherein the transmission control circuit further includes a determination circuit configured to determine whether the first display data is of an inversion target data type, and wherein the determination circuit bypasses the first display data to the data processing circuit when the first display data is not of the inversion target data type, and outputs the first display data to the inversion circuit when the first display data is of the inversion target data type.

9. The display driving device of claim 8, wherein the determination circuit includes:

a register configured to store information indicating whether the inversion target data type is odd-numbered data or even-numbered data;

a selection signal generation circuit configured to generate a selection signal at a low level when the first display data corresponds to the information stored in the register, and generate the selection signal at a high level when the first display data does not correspond to the information stored in the register; and a demultiplexer configured to bypass the first display data to the data processing circuit when the selection signal is at a high level, and output the first display data to the inversion circuit when the selection signal is at a low level.

10. A display device comprising the display driving device of claim 9.

11. The display driving device of claim 8, wherein the data processing circuit includes a first data processing circuit configured to process odd-numbered data and a second data processing circuit configured to process even-numbered data, and when the inversion target data type corresponds to the even-numbered data among the odd-numbered and even-numbered data, the determination circuit enables the first data processing circuit and disables the second data processing circuit if the first display data is not of the inversion target data type, and disables the first data processing circuit and enables the second data processing circuit if the first display data is of the inversion target data type.

12. The display driving device of claim 11, wherein when the inversion target data type corresponds to the odd-numbered data among the odd-numbered and even-numbered data, the determination circuit disables the first data processing circuit and enables the second data processing circuit if the first display data is not of the inversion target data type, and enables the first data processing circuit and disables the second data processing circuit if the first display data is of the inversion target data type.

13. A display device comprising the display driving device of claim 12.

14. A display device comprising the display driving device of claim 11.

15. A display device comprising the display driving device of claim 8.

16. The display driving device of claim 1, wherein the data processing circuit includes a digital-to-analog converter configured to output, for the first and second display data, a first grayscale voltage corresponding to the first group of data values among grayscale voltages by using an internal path for outputting a second grayscale voltage corresponding to the second group of data values.

17. A display device comprising the display driving device of claim 16.

18. A display device comprising the display driving device of claim 1.

* * * * *